United States Patent
McClure et al.

(10) Patent No.: US 7,356,981 B2
(45) Date of Patent: Apr. 15, 2008

(54) DOUBLE ROLL FEEDER FOR ROUND BALER

(75) Inventors: John R. McClure, New Holland, PA (US); James D. Walker, Lititz, PA (US)

(73) Assignee: CNH America LLC, New Holland, PA (US)

( * ) Notice: Subject to any disclaimer, the term of this patent is extended or adjusted under 35 U.S.C. 154(b) by 119 days.

(21) Appl. No.: 11/242,774

(22) Filed: Oct. 4, 2005

(65) Prior Publication Data
US 2007/0084146 A1    Apr. 19, 2007

(51) Int. Cl.
B65B 11/56    (2006.01)

(52) U.S. Cl. .................................................. 53/587
(58) Field of Classification Search ................ 53/118, 53/176, 211, 587, 430; 156/157, 502, 504, 156/505
See application file for complete search history.

(56) References Cited

U.S. PATENT DOCUMENTS

| | | |
|---|---|---|
| 546,358 A | 9/1895 | Sommer |
| 827,072 A | 7/1906 | Annand |
| 2,549,912 A | 4/1951 | Lindssay |
| 3,022,022 A | 2/1962 | Freeman |
| 3,335,973 A | 8/1967 | Genn |
| 4,264,401 A | 4/1981 | Ganz |
| 4,703,605 A * | 11/1987 | Ackermann .................. 53/587 |
| 4,956,968 A | 9/1990 | Underhill |
| 5,289,672 A | 3/1994 | Underhill |
| 5,849,123 A * | 12/1998 | Rice ........................... 156/502 |
| 5,934,602 A | 8/1999 | Jendroska et al. |
| 5,974,764 A * | 11/1999 | Anstey et al. ................ 53/587 |
| 6,021,622 A | 2/2000 | Underhill |
| 6,247,291 B1 | 6/2001 | Underhill |
| 6,247,515 B1 * | 6/2001 | Spatafora .................... 156/502 |
| 6,272,816 B1 | 8/2001 | Viaud et al. |
| 6,550,218 B2 | 4/2003 | McClure et al. |
| 6,701,992 B1 * | 3/2004 | Pasquale et al. ............ 156/502 |
| 7,111,438 B2 * | 9/2006 | Arima ......................... 53/587 |
| 2004/0084561 A1 | 5/2004 | Clifford et al. |

* cited by examiner

Primary Examiner—Louis Huynh
(74) Attorney, Agent, or Firm—Patrick M. Sheldrake; John William Stader; Michael G. Harms

(57) ABSTRACT

A round bale wrapping mechanism that employs a second roll of wrapping material that is mounted adjacent an active roll. The second roll is powered by an electric clutch that allows a belt drive connected between the first roll and the second roll to rotate the second roll of wrapping material. The wrapping material on the second roll thus feeds onto the wrapping material being fed from the active roll and if fed through the wrapping mechanism onto the bale before the active roll is exhausted of wrapping material.

14 Claims, 4 Drawing Sheets

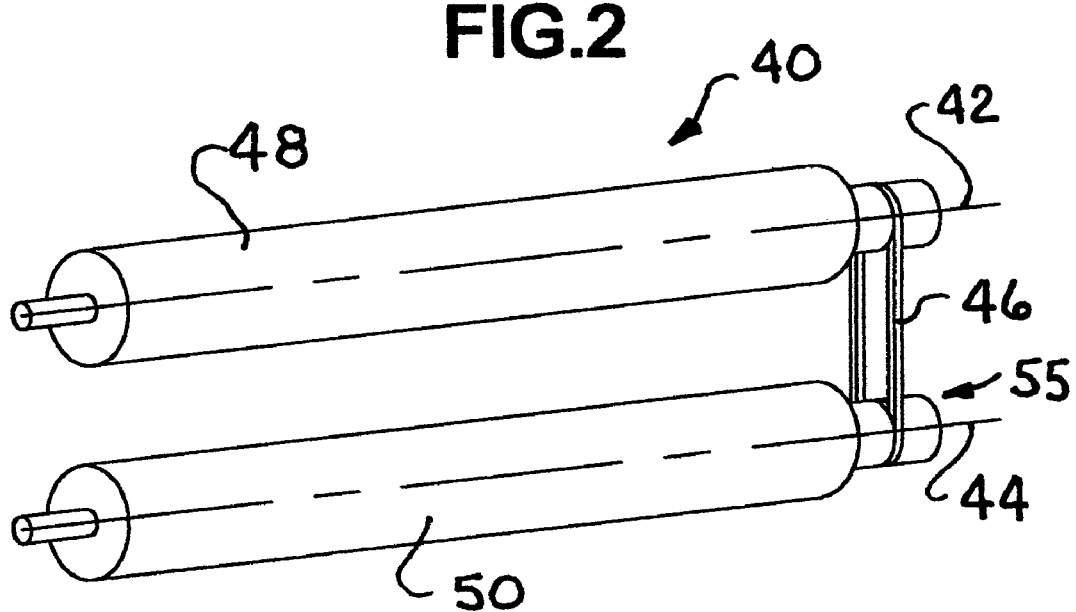
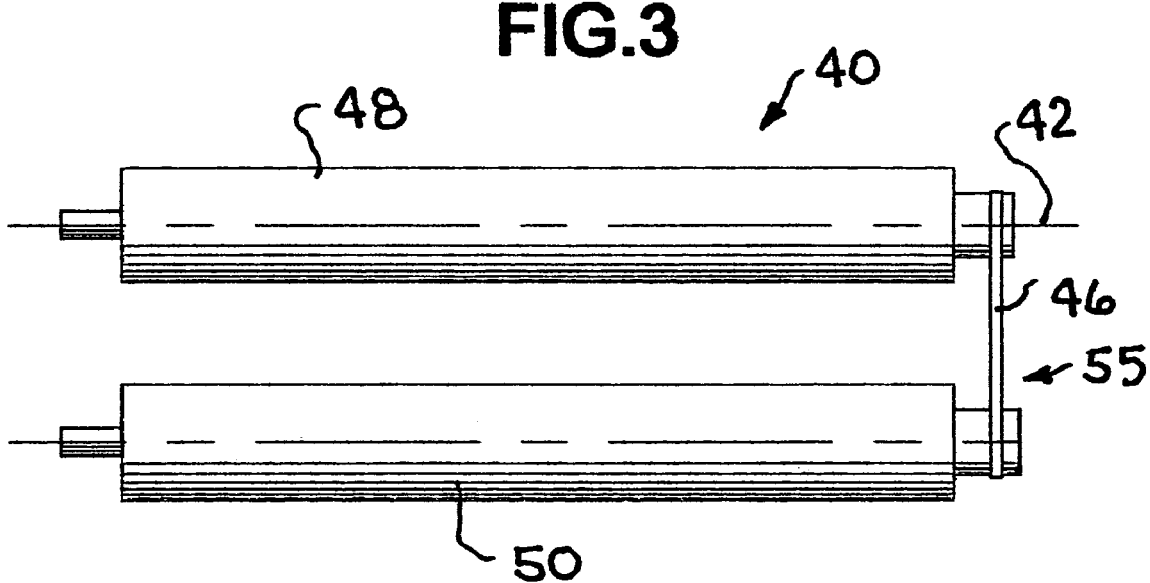

DOUBLE ROLL FEEDER FOR ROUND BALER

BACKGROUND OF THE INVENTION

The present invention relates generally to round balers with net wrapping capabilities, and more particularly to a net wrapping mechanism for a round baler that self-threads a new roll of wrapping material as the initial roll is consumed.

In the crop packaging industry, generally a smaller part of the cattle/dairy industry, round balers have become quite prevalent for their capability of producing a conveniently sized cylindrical bale, very often automatically wrapped with a sheeting material such as net or film. Prior art round balers generally have a bale-forming chamber defined by an apron comprising an array of side-by-side belts, a plurality of rolls or a combination of these various elements, e.g., rolls and belts. Crop material, such as hay, is picked up from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling. The wrapping mechanisms generally dispense wrapping material from a roll, and have a location for a stored roll, but in order to use the stored roll, the operator must stop the machine and manually load and thread the second roll.

Common practice has the baler wrap the bales with twine, net-like or continuous plastic sheeting. With twine, the bale is wrapped back and forth from side-to-side as the bale is turned, from a single dispensing mechanism, or back and forth from middle-to-side as the bale is turned, from dual dispensing mechanisms with twine numerous times, the twine "gripping" the crop material and prior wrappings of twine adequately to hold the package together in a process often referred to as "tying". Net wrap is generally made of a woven or extruded polymer with the appearance of a fish net, generally equal in width to the bale being formed, with regular openings therethrough and is overlapped on itself to hold the package together. An adhesive may be used to improve the holding power of the net wrap. Plastic wrap, or film, is a generally continuous sheet of plastic, also generally the width of the bale being formed, with a somewhat adhesive surface that grips itself when overlapped and the crop material to form the package.

Replacing a sheet roll on current round balers generally requires a substantial amount of work. First, the operator must remove the empty roll and carry a full roll from the storage box to the wrapper assembly. After installing the full roll into the wrapper assembly, the operator must thread the end of the roll around spreader rolls and through the duckbill, or similar, dispensing assembly. The process takes an experienced operator about five minutes, and would be done once or twice during a normal baling day. While this amount of time is small, any improvements made to this reloading cycle will help reduce operator fatigue and stress, and as such will offer significant marketing advantage over competitive units.

It would be a great advantage to provide a self-threading capability to a round baler wrapping mechanism that overcomes the above-identified problems and disadvantages.

SUMMARY OF THE INVENTION

Accordingly, it is an object of the present invention to provide an improved round bale wrapping mechanism that avoids the above-noted disadvantages.

It is another object of the present invention to provide a round bale wrapping mechanism that provides storage for a second roll of wrapping material, in addition to a roll being dispensed.

It is a further object of the present invention to provide a round bale wrapping mechanism that is self-threading, allowing the operator to replace a roll of sheet wrapping material with a minimal amount of work.

It is a further object of the present invention to provide a round baler net wrapping mechanism that carries two rolls of wrapping material that allows the operator to selectively replace the active roll with one in a storage position.

These and other objects are achieved by providing a round bale wrapping mechanism that employs a second roll of wrapping material that is mounted adjacent an active roll. The second roll is powered by an electric clutch that allows a belt drive connected between the first roll and the second roll to rotate the second roll of wrapping material. The wrapping material on the second roll thus feeds onto the wrapping material being fed from the active roll and if fed through the wrapping mechanism onto the bale before the active roll is exhausted of wrapping material.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial perspective view of the sheet wrapper, showing the various components;

FIG. 3 is a partial front plan view of the sheet wrapper, showing various components;

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
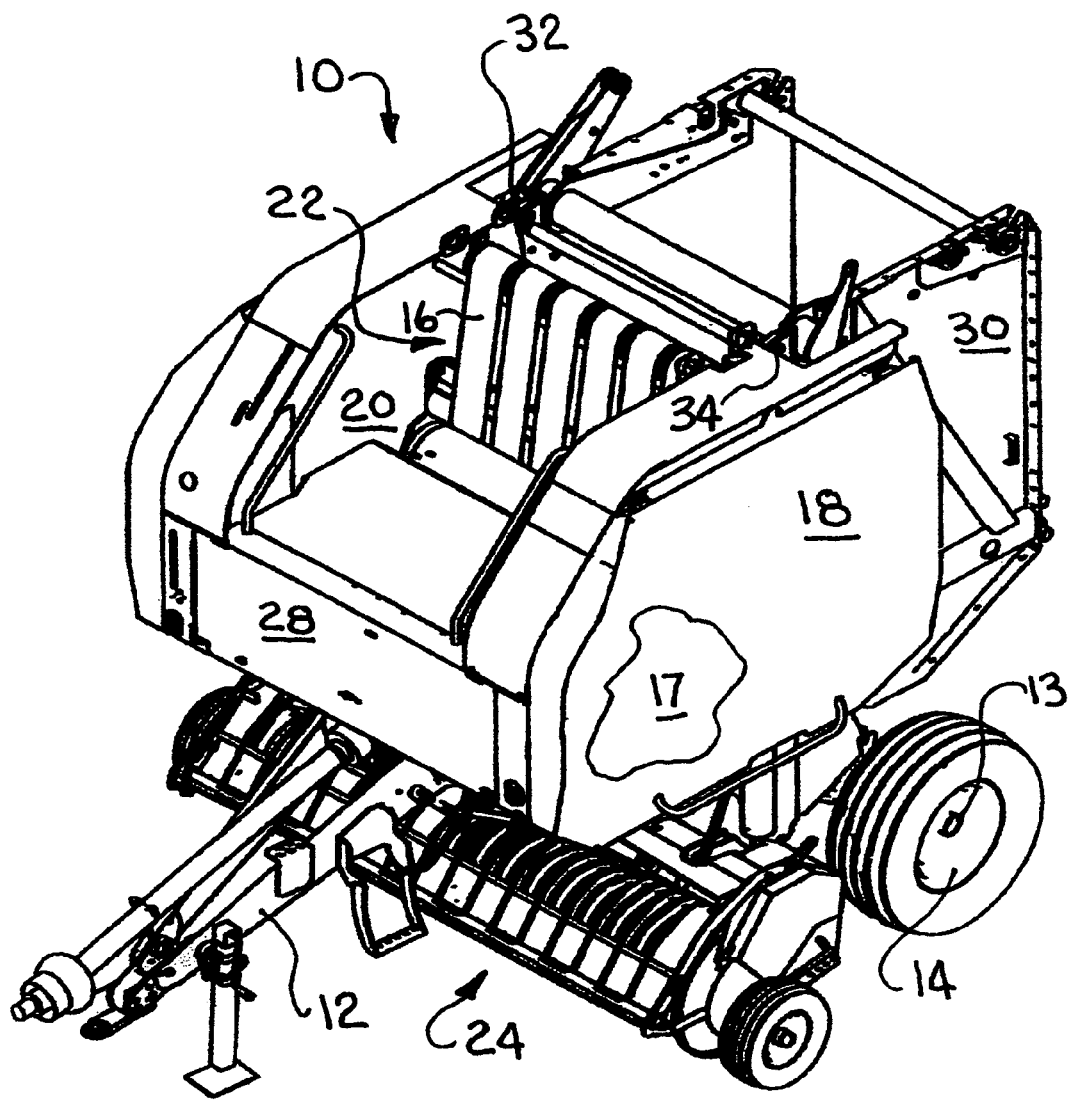
FIG. 1 is a diagrammatic overview of a round baler of the type which could employ the apparatus of the instant invention.

Referring to FIG. 1, a generally well-known round baler 10, with which the bale wrapper of the present invention can be used, is shown to comprise a main frame terminating forwardly in a tongue 12 and rearwardly slightly beyond a transverse axle 13 to which a pair of wheels 14 (only one shown) are mounted—thus forming a wheel supported main frame (not shown in detail). The main frame supports a series of belts 16 and floor rolls (not shown) which together with a first sidewall 17 (shown in the breakout) behind and generally parallel to cover panel 18 and a second sidewall 20, all together establishing a bale-forming chamber 22. Cut crop material is picked up by transverse pickup 24 and fed into bale-forming chamber 22 where it is, as discussed above, formed into a cylindrically shaped bale. It is then wrapped with twine or a wrapping material dispensed from a wrapping mechanism generally behind shield 28. Upon completion of the wrapping process, the tailgate 30 pivots upwardly about pivot points 32, 34 and the bale is ejected onto the ground. Exemplary prior art wrapping mechanisms are shown in U.S. Pat. Nos. 4,366,665; 4,790,125; and U.S. Pat. No. 4,956,968.

The wrapping material can, as previously mentioned, be either net wrap or a generally solid film, though, because net wrap is the preferred material, further description will refer primarily to net wrap or net roll. This mechanism does not handle twine. FIG. 2 is a partial perspective view of the general roll supporting structure. An active roll 50 is rotatably and removably attached at its ends, along longitudinal axis 44 to sidewalls 17 and 20. A storage roll 48 is rotatably and removably attached at its ends, along longitudinal axis 42, and positioned generally above active roll 50; however, with additional guides or pinch rollers the storage roll could be in substantially any position relative to the active roll that does not interfere with feeding of the wrapping material. Belt 46 is wrapped around the two net rolls 48, 50, with an electric, or mechanical, clutch 55 on axis of roll 50.

Figure 4:
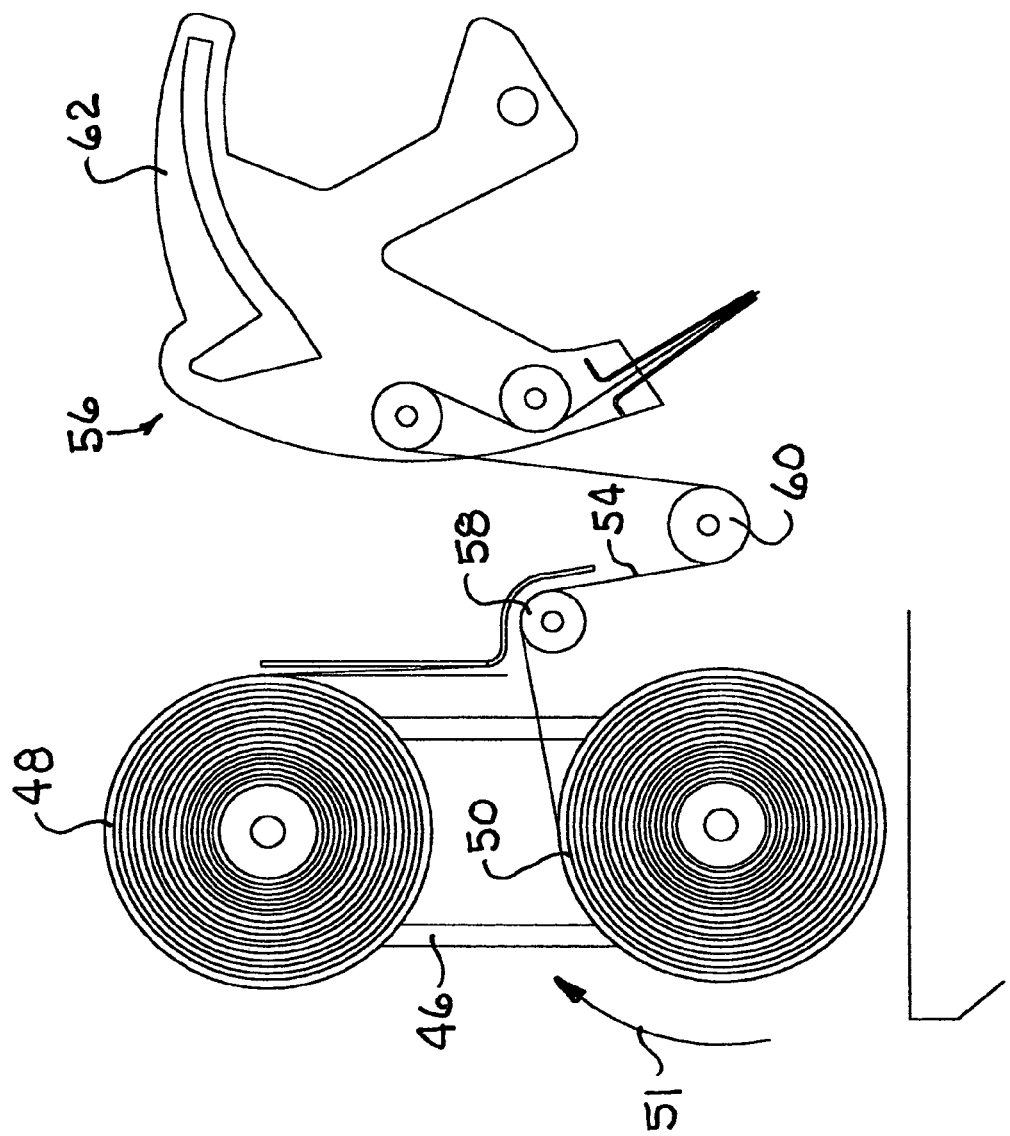
FIG. 4 is a partial depiction of the right end view of the wrapper mechanism, spreader rolls and duckbill (showing two full rolls)

FIG. 4 is a partial depiction of the right end view of the wrapper mechanism, net rolls and duckbill with both net rolls 48, 50 with full supplies of wrapping material. FIG. 4 further depicts a currently used mechanism 56 for feeding net wrap 54 onto a bale. The net feeds off the roll 50 in the direction of arrow 51, is threaded over spreader rolls 58, 60 and into duckbill assembly 62. From the duckbill, the net is fed onto the rotating bale for complete wrapping.

Figure 5:
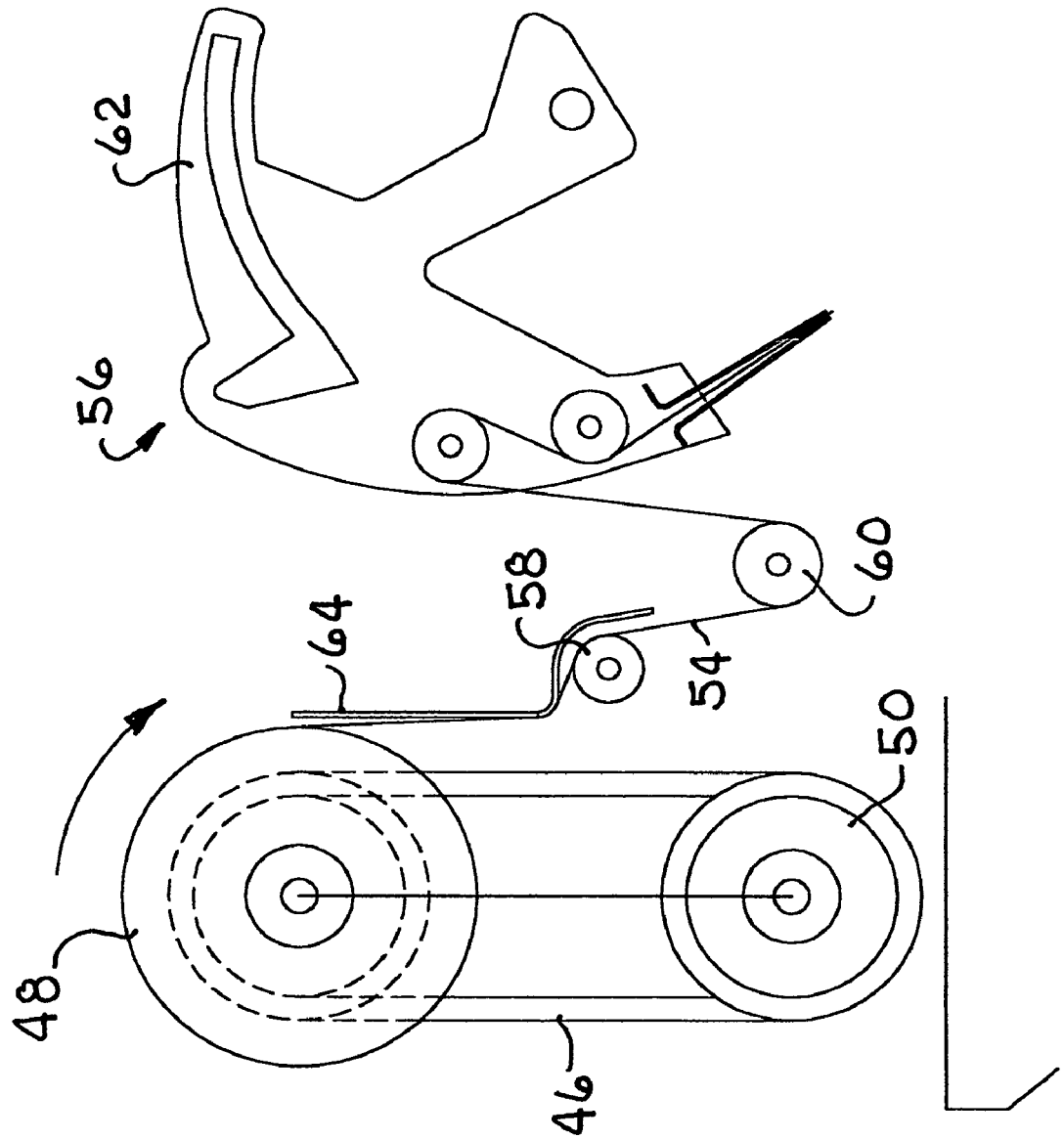
FIG. 5 is a right end view, similar to FIG. 4, showing the empty lower roll and the full upper roll after threading.

When using the self-threading feature of this invention, the active roll and the stored roll remain in the same position. As can be seen in FIG. 5, active roll 50 has completely emptied and the upper roll 48 has become active. The upper roll 48 is powered by electric clutch 55. When the lower roll 50 begins to reach the exhaustion point, a low net indicator, or observation of the operator, indicates that the lower roll 50 is almost empty and the electric clutch 55 is activated to allow the belt drive 46, connected between the lower roll 50 and the upper roll 48, to rotate the upper roll 48. Net is thus fed off the roll 48, guided by shield 64, into contact with the wrapping material being fed from the active roll 50 of net, pulling it along the same path, allowing the upper roll 48 of net to go through the wrapping mechanism and onto the bale. Moments later, the lower roll 50 of net is used up. The upper roll 48 of net would continue to be used until the operator installs another roll of net in the lower net box.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural round baler having a forward end, an opposing rear end and opposing first and second sides, a bale-forming chamber defined by belts, rollers and the opposing sides of the baler, a wrapping mechanism for wrapping a bale of crop material with a sheet-like wrapping material within the bale-forming chamber prior to ejection, the improvement comprising:
    first and second elongate rolls of bale wrapping material, each roll having a first and opposing second end;
    a roll support affixed to the baler, the roll support including first and second shafts extend axially through respective rolls and rotatably supporting the first and second rolls generally transversely between the sides of the baler;
    a selective drive for selectively rotationally coupling the first and second rolls;
    the second roll supported generally adjacent the first roll and the first roll feeding wrapping material along a predetermined path to the wrapping mechanism;
    the second roll selectively driven by the selective drive to rotate and feed wrapping material thereon downwardly into contact with the wrapping material moving along the predetermined path, whereby as the wrapping material on the first roll approaches exhaustion, the second roll can be selectively rotated to feed wrapping material into contact with the wrapping material from the first roll and wrapped around the bale in the bale forming-chamber, and the second roll supplants the first roll as the source of wrapping material.

2. The improvement of claim 1, further including:
    a guide for directing the wrapping material from the second roll into the predetermined path and into contact with the wrapping material being fed from the first roll.

3. The improvement of claim 2, wherein:
    the guide is a generally planar shield-like member extending generally parallel to the length of the elongate first and second rolls, between the sides of the baler.

4. The improvement of claim 3, further including:
    the second roll is generally above and parallel to the first roll and the selective drive includes a belt drive system selectively driven through a clutch mechanism.

5. The improvement of claim 3, wherein:
    the wrapping material comprises a film.

6. The improvement of claim 5, wherein:
    the second roll is generally above and parallel to the first roll and the selective drive includes a belt drive system selectively driven through a clutch mechanism.

7. The improvement of claim 5, wherein:
    the film has a coat of adhesive thereon.

8. The improvement of claim 7, wherein:

the second roll is generally above and parallel to the first roll and the selective drive includes a belt drive system selectively driven through a clutch mechanism.

9. In an agricultural round baler having a forward end, an opposing rear end and opposing first and second sides, a bale-forming chamber defined by belts, rollers and the opposing sides of the baler, a wrapping mechanism for wrapping a bale of crop material with a sheet-like wrapping material within the bale-forming chamber prior to ejection, the improvement comprising:

a roll carrier holding an elongate active roll of wrapping material and an elongate storage roll of wrapping material across the bale-forming chamber generally between the opposing sides of the baler;

the active roll feeding wrapping material along a predetermined path into the wrapping mechanism;

a selective drive rotationally connecting the active and storage rolls to selectively rotate the storage roll and allow wrapping material thereon to unroll into the predetermined path, whereby the wrapping material on the storage roll is pulled through the wrapping mechanism by the wrapping material on the active roll.

10. The improvement of claim 9, further including:

a guide for directing the wrapping material from the storage roll into the predetermined path and into contact with the wrapping material being fed from the active roll.

11. The improvement of claim 10, wherein:

the guide is a generally planar shield-like member extending generally parallel to the length of the elongate active and storage rolls, between the sides of the baler.

12. The improvement of claim 11, wherein:

the wrapping material comprises a film.

13. The improvement of claim 12, wherein:

the film has a coat of adhesive thereon.

14. The improvement of claim 13, further including:

the selective drive includes an electric clutch.

* * * * *